United States Patent
Yang

(10) Patent No.: US 9,493,183 B2
(45) Date of Patent: Nov. 15, 2016

(54) FRICTION COMPENSATION LOGIC OF MOTOR DRIVEN POWER STEERING SYSTEM AND METHOD THEREOF

(71) Applicant: HYUNDAI MOBIS CO., LTD., Seoul (KR)

(72) Inventor: Seung Hoon Yang, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 14/697,911

(22) Filed: Apr. 28, 2015

(65) Prior Publication Data
US 2016/0090120 A1  Mar. 31, 2016

(30) Foreign Application Priority Data
Sep. 25, 2014  (KR) .................. 10-2014-0128086

(51) Int. Cl.
*B62D 5/04* (2006.01)

(52) U.S. Cl.
CPC .................. *B62D 5/0463* (2013.01)

(58) Field of Classification Search
CPC . B62D 5/0463; B62D 5/0466; B62D 5/0472
See application file for complete search history.

(56) References Cited

U.S. PATENT DOCUMENTS

| 2011/0010054 A1* | 1/2011 | Wilson-Jones | B62D 5/0463 701/42 |
| 2011/0224876 A1* | 9/2011 | Paholics | B62D 5/0463 701/42 |

FOREIGN PATENT DOCUMENTS

KR  10-2012-0053300 A  5/2012

* cited by examiner

*Primary Examiner* — Yuen Wong
(74) *Attorney, Agent, or Firm* — Knobbe Martens Olson & Bear LLP

(57) ABSTRACT

A friction compensation logic of an MDPS (motor driven power steering) system to receive and to process a column torque signal and to output a friction compensation torque comprises: an accumulation speed adjusting portion to adjust an accumulation speed of a compensation section information set in the column torque signal; and a compensation amount adjusting portion in accordance with a vehicle speed to control so that the accumulation speed adjusting portion adjusts the accumulation speed of the compensation section information fast or slow in accordance with the vehicle speed, to adjust a compensation amount gain small or large in accordance with the vehicle speed, and to output a friction compensation torque.

8 Claims, 5 Drawing Sheets

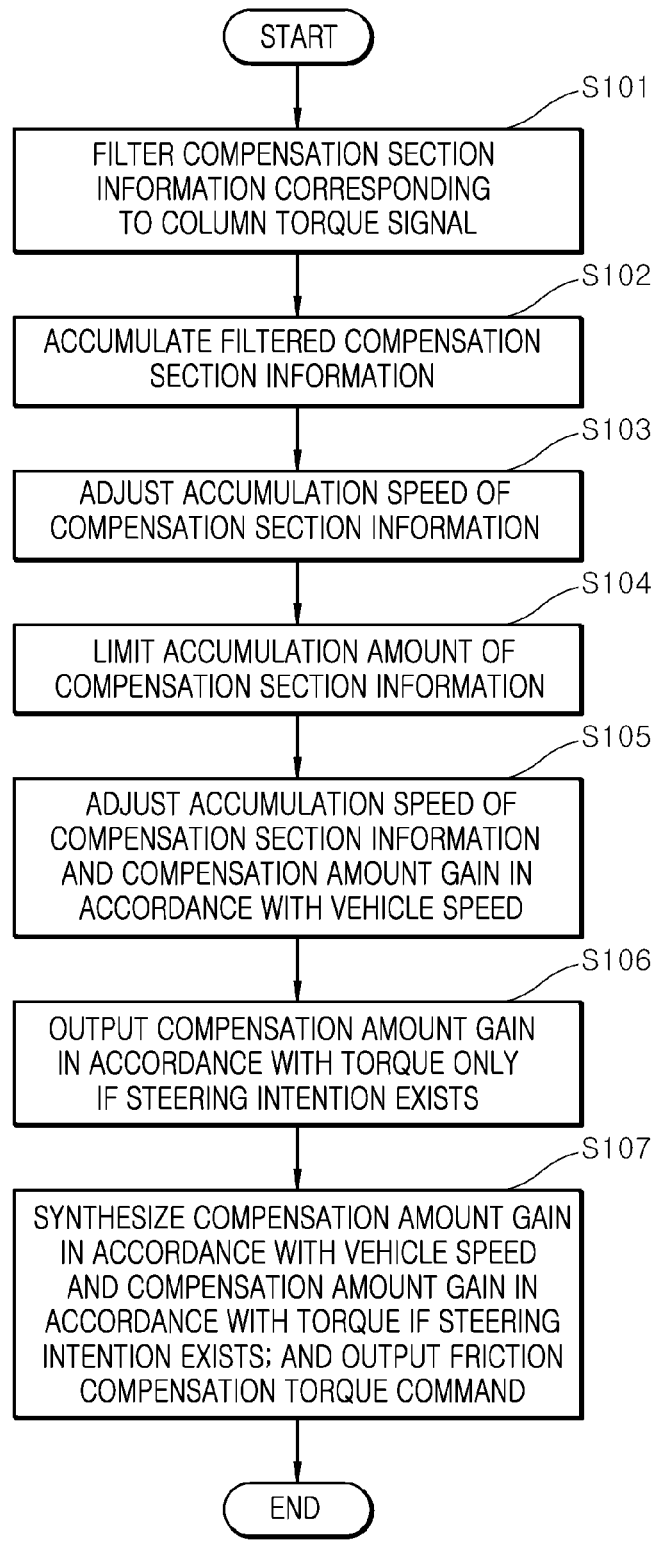

FRICTION COMPENSATION LOGIC OF MOTOR DRIVEN POWER STEERING SYSTEM AND METHOD THEREOF

CROSS-REFERENCE TO RELATED APPLICATION

The present application claims priority under 35 U.S.C. §119(a) to Korean patent application number 10-2014-0128086, filed on Sep. 25, 2014, in the Korean Intellectual Property Office, which is incorporated herein by reference in its entirety.

BACKGROUND

1. Technical Field

Embodiments relate to a friction compensation logic of a motor driven power steering (MDPS) system and a method thereof, and more particularly, to a friction compensation logic and method of an MDPS system wherein a slope of a friction compensation is adjusted according to the amount of a friction compensation, a stable friction compensation is provided and vibration caused in the MDPS system is improved.

2. Related Art

Generally, an electric power steering (for example, MDPS) system is not a system in which a power pump is driven, oil is circulated and a power steering wheel is operated, but one in which a steering motor is installed in the lower portion of an axis of a steering wheel and the steering motor is operated when a vehicle is driven and the power steering wheel is operated.

The background technology is disclosed in Korean Laid-open Patent Publication No. 10-2012-0053300 (published on May 25, 2012, title of invention: a control device and method of a vehicle MDPS).

SUMMARY

Various embodiments are directed to a friction compensation logic and method of an MDPS system. An aspect of the invention provides a friction compensation logic and method of an MDPS system wherein a slope of a friction compensation is adjusted according to the amount of a friction compensation, a stable friction compensation is provided and vibration caused in the MDPS system is improved.

In a friction compensation logic of an MDPS system according to an embodiment, a friction compensation logic is to receive and process a column torque signal, and is to output a friction compensation torque. The friction compensation logic comprises: an accumulation speed adjusting portion; and a compensation amount adjusting portion, in accordance with a vehicle speed, to control so that the accumulation speed adjusting portion adjusts the accumulation speed in the compensation section information fast or slow in accordance with the vehicle speed, to adjust a compensation amount gain small or large in accordance with the vehicle speed, and to output a friction compensation torque.

In an embodiment, the accumulation speed adjusting portion adjusts an accumulation speed of a compensation section information fast and adjusts a compensation amount gain small if the vehicle speed is fast.

In an embodiment, the accumulation speed adjusting portion adjusts an accumulation speed of a compensation section information slow and adjusts a compensation amount gain large if a vehicle speed is slow.

In an embodiment, the friction compensation logic in the MDPS system further comprises a decouple gain adjusting portion configured to output a compensation amount gain in accordance with the torque if a torque in accordance with the user's steering is generated, to provide a friction compensation if the user's steering exists.

In an embodiment, the decouple gain adjusting portion outputs a compensation amount gain in accordance with a torque by using a column torque/gain information which is stored in advance in a form of a look up table.

In an embodiment, the friction compensation logic in the MDPS system further comprises a compensation amount gain synthesizing portion configured to synthesize a compensation amount gain outputted from the compensation amount adjusting portion in accordance with a vehicle speed and a compensation amount gain outputted corresponding to a torque generated in accordance with the user's steering from the decouple gain adjusting portion, and to output a resultant friction compensation torque.

In an embodiment, a friction compensation method in the MDPS system comprises: adjusting, by an accumulation speed adjusting portion, a speed (timing) for accumulating a compensation section information which is set in the column torque signal; controlling the system, by a compensation amount adjusting portion, in accordance with a vehicle speed such that the accumulation speed adjusting portion adjusts the accumulation speed in the compensation section information fast or slow in accordance with the vehicle speed, adjusting a compensation amount gain, small or large, in accordance with the vehicle speed, and outputting a friction compensation torque.

In an embodiment, in outputting the friction compensation torque, the compensation amount adjusting portion in accordance with the vehicle speed controls so that the accumulation speed adjusting portion adjusts an accumulation speed of a compensation section information fast and adjusts a compensation amount gain small if the vehicle speed is fast.

In an embodiment, in outputting the friction compensation torque, the compensation amount adjusting portion in accordance with a vehicle speed controls so that the accumulation speed adjusting portion adjusts an accumulation speed of a compensation section information slow and adjusts a compensation amount gain large if the vehicle speed is slow.

In an embodiment, the method further comprises outputting a compensation amount gain corresponding to a torque in accordance with the user's steering by a decouple gain adjusting portion only if a torque in accordance with the user's steering is generated.

In an embodiment, in outputting the compensation amount gain corresponding to the torque in accordance with the user's steering, the decouple gain adjusting portion outputs the compensation amount gain in accordance with the torque by using a column torque or gain information which is stored in advance in a form of a look up table.

In an embodiment, the method further comprises synthesizing by a compensation amount gain synthesizing portion a compensation amount gain outputted from the compensation amount adjusting portion in accordance with a vehicle speed and a compensation amount gain outputted corresponding to a torque generated in accordance with the user's steering from the decouple gain adjusting portion, and outputting a resultant friction compensation torque.

In an embodiment, a friction compensation slope is adjusted in accordance with a friction compensation amount so that a stable friction compensation is provided, a vibration induced to an MDPS system is improved, and therefore a vibration is not generated in an MDPS system although an amount of friction compensation torque is increased.

BRIEF DESCRIPTION OF THE DRAWINGS

FIG. 5 is a flow chart showing a method of compensating a friction of a MDPS system according to an embodiment.

DETAILED DESCRIPTION

Hereinafter, embodiments will be described below with reference to the accompanying drawings through various examples.

While various embodiments are described below, it will be understood to those skilled in the art that the embodiments described are by way of example only. Accordingly, the device or equipment described herein should not be limited based on the described embodiments.

In a motor driven power steering (MDPS) system, the MDPS system calculates a motor torque command by reflecting a friction compensation torque command for a smooth operation. The reason is that, in an MDPS system, if a steering motor cannot generate auxiliary steering power to the required extent due to friction generated when each steering component is driven, the driving of a steering wheel by the steering motor is not easy and a steering feeling or an initial build-up feeling is not good, and therefore a driver feels a difference in steering.

In addition, the friction compensation torque command is outputted as a shape close to a step to compensate the friction of the mechanism. The larger the friction compensation torque command is, the more abrupt the change of the value of the command is. Therefore, vibration may be generated in the MDPS system, as shown in a graph in FIG. 1.

That is, if the amount of the friction compensation torque command is large, vibration may be generated in the MDPS system as the amount of the compensation is abruptly changed.

Figure 2:
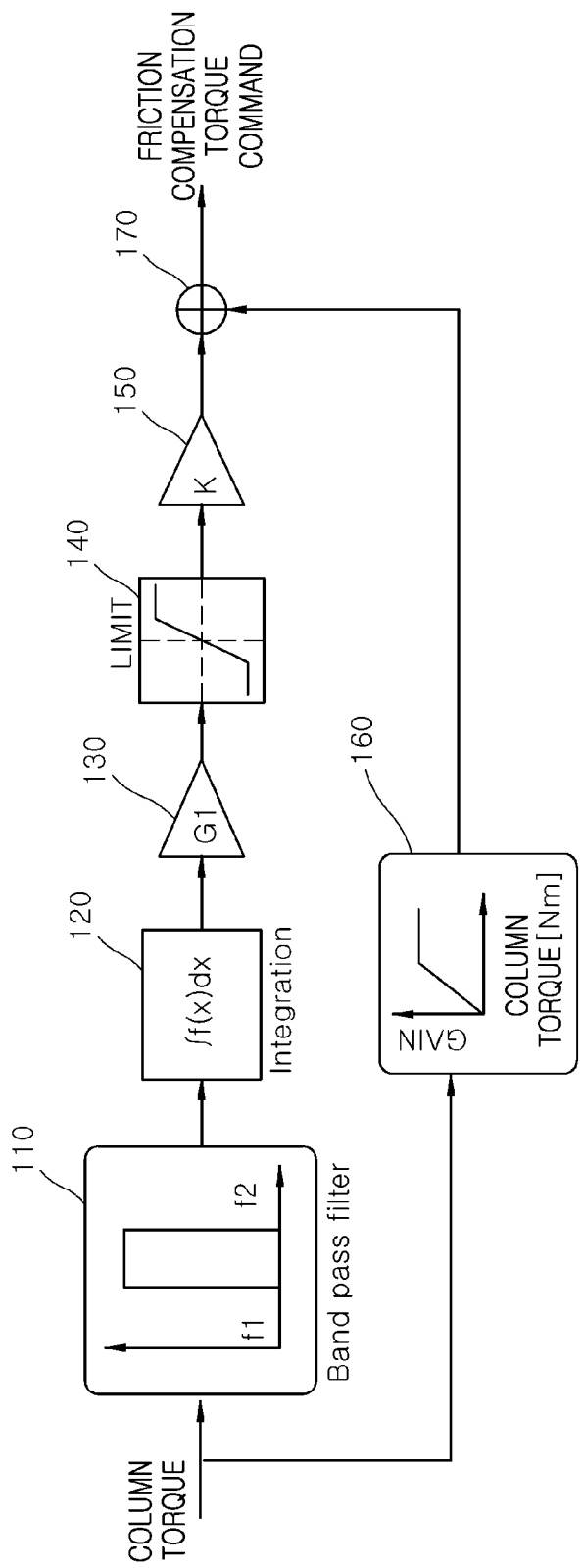
FIG. 2 is a sample drawing of a schematic configuration of a friction compensation logic of an MDPS system according to an embodiment.

FIG. 2 is a sample drawing of a schematic configuration of a friction compensation logic of an MDPS system according to an embodiment.

As shown in FIG. 2, a friction compensation logic of the MDPS system according to an embodiment includes a compensation section selecting portion 110, a compensation section accumulating portion 120, an accumulation speed adjusting portion 130, an accumulation limiting portion 140, a compensation amount adjusting portion 150 in accordance with a vehicle speed, a decouple gain adjusting portion 160, and a compensation amount gain synthesizing portion 170.

The compensation section selecting portion 110 selects a compensation section by a band pass filter (BPF) which passes a limited range of frequency band of a column torque signal. For example, when a driver tries to rotate a steering wheel, the band pass filter (BPF) filters the timing of the change.

The compensation section accumulating portion 120 accumulates (integrates) the information (for example, frequency) from the band pass filter (compensation section selecting portion 110). According to the accumulation (integration) of the compensation section information, it is possible to determine whether the driver rotates the steering wheel to the left, or to the right. That is, the compensation section accumulating portion 120 integrates the information of the compensation section (e.g., frequency) and it is possible to determine the direction.

The accumulation speed adjusting portion 130 adjusts the speed for integrating the information.

That is, when the driver rotates the steering wheel, the direction by the driver to rotate can be determined rapidly or slowly. If a fast determination is required, a speed for integration is adjusted fast. If a slow determination is required, speed for integration is adjusted slow.

The accumulation limiting portion 140 limits the amount of integration when the compensation section information is accumulated (integrated). If the compensation section information is unlimitedly and continuously accumulated, the timing to determine the compensation directions is delayed. Therefore, while the compensation section information is accumulated, it is limited to the extent that the compensation direction is determined thereby determining the compensation direction rapidly.

However, if the integration is fast, (i.e., the determination of the direction is fast), or if a compensation amount is large, vibration may be generated in the MDPS system. If vibration is generated, the mechanism of the MDPS system may be damaged.

Accordingly, the compensation amount adjusting portion 150 controls so that, if the vehicle is fast, the accumulation speed adjusting portion 130 adjusts the speed for integration of the compensation section information fast and contrastingly adjusts a compensation amount gain K small. If the vehicle is slow, it controls so that the accumulation speed adjusting portion 130 adjusts the accumulation speed of the compensation section information slow and contrastingly adjusts the compensation amount gain K large.

The decouple gain adjusting portion 160 accomplishes a friction compensation (that is, the decouple gain adjusting portion 160 outputs a compensation amount gain in accordance with a torque) when the driver operates the steering wheel. If the driver releases the steering wheel, the decouple gain adjusting portion 160 does not accomplish a friction compensation. That is, if a torque which controls a steering wheel based on the driver's driving intention does not exist, a compensation amount gain becomes the minimum (for example, zero).

The compensation amount gain synthesizing portion 170 synthesizes a compensation amount gain outputted from the compensation amount adjusting portion 150 in accordance with a vehicle speed and a compensation amount gain outputted from the decouple gain adjusting portion 160, and outputs a resultant friction compensation torque command.

Therefore, in an embodiment, a compensation amount gain is adjusted to be small when integration occurs fast so that vibration is not generated in the MDPS system. The integration speed is adjusted to be slow if a compensation amount is adjusted to be large so that vibration is not generated in the MDPS system.

Figure 1:
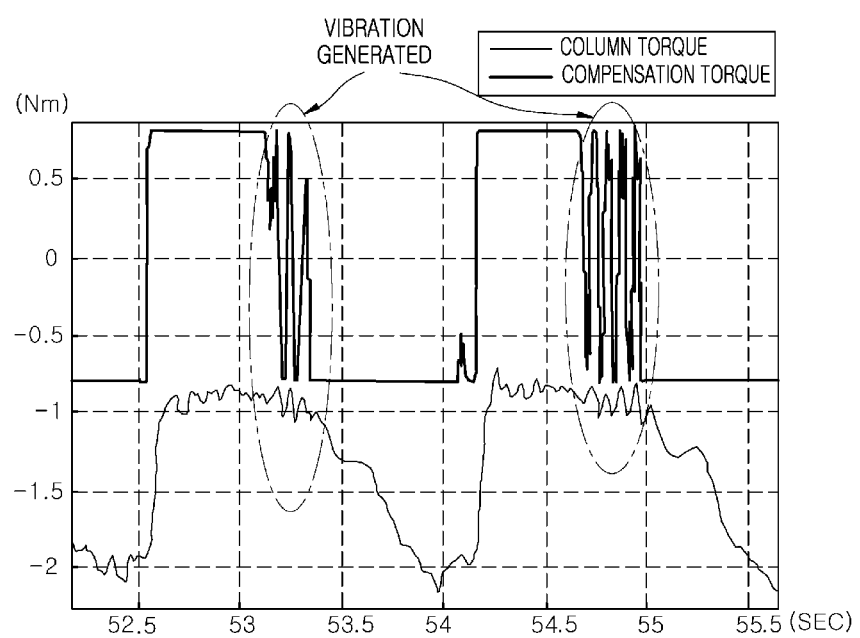
FIG. 1 is an example shown in a graph depicting the phenomena that a vibration is generated in accordance with an increase of an amount of a conventional friction compensation torque command.
Figure 3:
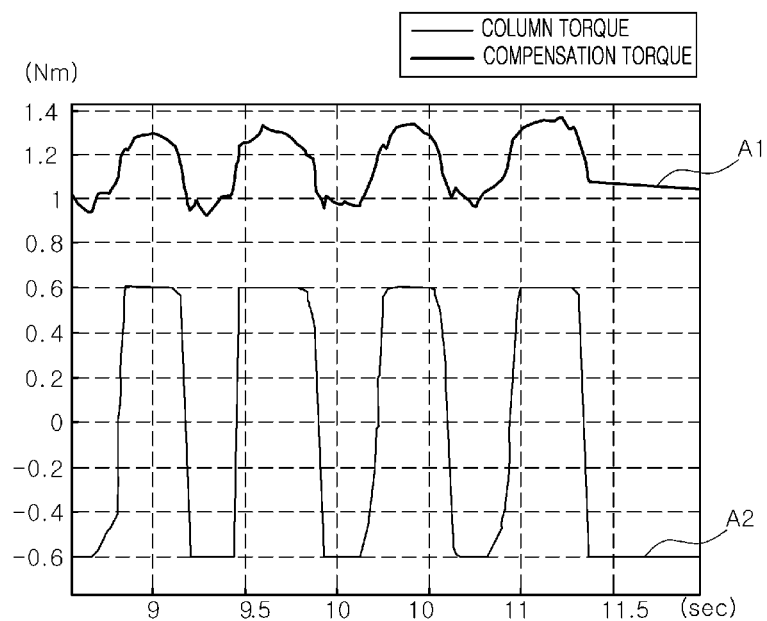
FIG. 3 is a sample graph of a performance evaluation result after a friction compensation logic of an MDPS system according to an embodiment is applied.

In FIG. 3, comparing with the graph in FIG. 1, vibrations are not generated even if the amount of compensation torque A1 is increased corresponding to column torque A2.

FIG. 3 is a sample graph of a performance evaluation result after a friction compensation logic of the MDPS system according to an embodiment is applied.

Figure 4:
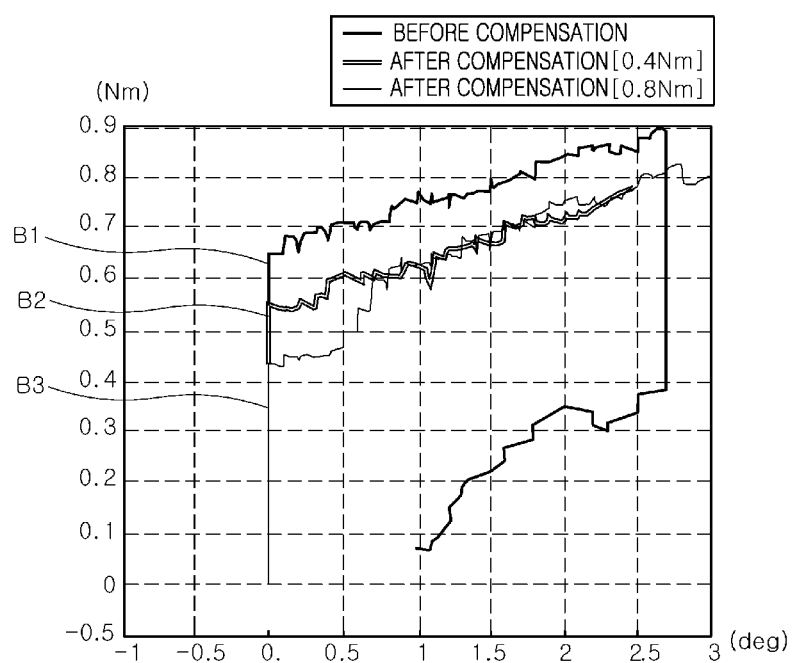
FIG. 4 is a sample graph of steering hysteresis before and after the compensation of a friction compensation torque.

FIG. 4 is a sample graph of steering hysteresis before and after the compensation of a friction compensation torque. As shown in the simulation result in FIG. 4, values of the initial driving torque decrease gradually in the order of a driving torque B1 before friction compensation torque is applied, a driving torque B2 after friction compensation torque of 0.4 Nm is applied, driving torque B3 after friction compensation torque of 0.8 Nm is applied.

FIG. 5 is a flow chart showing a method of compensating a friction of the MDPS system according to an embodiment. Referring to FIG. 5, the detailed operation is described.

In a method of compensating friction generated in the MDPS system according to an embodiment, a column torque signal inputted from a column torque is filtered by a band pass filter so that only an information (for example, frequency band) which is selected in a compensation section can be passed (S101).

Next, a compensation section information which is filtered by the band pass filter is accumulated by the compensation section accumulating portion 120 so that a column torque signal which passed the band pass filter can be used in determining a friction compensation direction (S102).

The integration speed is adjusted by the accumulation speed adjusting portion 130 so that the speed of determining the direction of a friction compensation can be adjusted in accordance with a vehicle speed (S103).

If a fast determination is required, the integration speed is adjusted fast. If a slow determination is required, the integration speed is adjusted slow.

In accumulating the compensation section information, the integration is limited by the accumulation limiting portion 140 (S104).

The reason is that the timing to determine a compensation direction may be delayed if the compensation section information is unlimited and continuously accumulated. Therefore, while a compensation section information is accumulated, it is limited so that a compensation direction may be determined (for example, ±1). Accordingly, the compensation direction may be determined rapidly.

The compensation amount adjusting portion 150 in accordance with a vehicle speed controls so that the accumulation speed adjusting portion 130 adjusts the integration speed fast and adjusts a compensation amount gain K small if the vehicle is fast.

The compensation amount adjusting portion 150 in accordance with a vehicle speed controls so that the accumulation speed adjusting portion 130 adjusts the integration speed slow and adjusts a compensation amount gain K large if the vehicle is slow (S105).

A friction compensation is not accomplished if the user's steering does not exist, for example, the user releases a steering wheel. A friction compensation is accomplished only if the user's steering exists. For this, the decouple gain adjusting portion 160 outputs a compensation amount gain in accordance with a torque (S106).

The decouple gain adjusting portion 160 may output a compensation amount gain in accordance with torque stored in a look up table.

Finally, a compensation amount gain outputted from the compensation amount adjusting portion 150 in accordance with the vehicle speed and a compensation amount gain outputted from the decouple gain adjusting portion 160 are synthesized and a resultant friction compensation torque command is outputted (S107).

As described above, in this embodiment, vibrations are not generated in the MDPS system even if the integration speed is fast or if a compensation amount is large. Therefore, a mechanism of the MDPS system is prevented to be damaged by a mechanical friction.

While various embodiments have been described above, it will be understood to those skilled in the art that the embodiments described are by way of example only. Accordingly, the device described herein should not be limited based on the described embodiments.

What is claimed is:

1. A motor driven power steering system comprising:
a controller; and
a friction compensation logic,
wherein the system is configured to:
bandpass-filter column torque signals representing column torque to extract certain frequency components of the column torque signals;
integrate the extracted frequency components of the column torque signals to provide processed signals;
determine, by the controller, a steering direction being left or right based on the processed signals;
upon determining the steering direction, generate a friction compensation torque command indicative of an amount of torque for friction compensation using an adjustable gain; and
adjust timing for integration and the adjustable gain based on a speed of the vehicle such that the higher the speed of the vehicle, the more frequently integration is conducted and the smaller the adjustable gain, for controlling the amount of torque for friction compensation to apply to a steering motor.

2. The motor driven power steering system of claim 1, the system further configured to generate a decouple compensation torque command by applying to the column torque an adjustable decouple gain that varies according to the column torque.

3. The motor driven power steering system of claim 2, the system is further configured to refer to a predetermined look up table for determining the adjustable decouple gain corresponding to the column torque.

4. The motor driven power steering system of claim 2, the system is further configured to synthesize the friction compensation torque command and the decouple compensation torque command for generating an output signal of the friction compensation logic.

5. A friction compensation method in a motor driven power steering (MDPS) system of a vehicle, the method comprising:
providing column torque signals representing column torque for steering the vehicle;
bandpass-filtering the column torque signals to extract certain frequency components of the column torque signals; and
integrating the extracted frequency components of the column torque signals to provide processed signals;
determining, by a controller, a steering direction being left or right based on the processed signals; and
upon determining the steering direction, generating a friction compensation torque command indicative of an amount of torque for friction compensation using an adjustable gain that varies based on a speed of the vehicle, wherein timing for integrating the column torque signals and the adjustable gain are adjusted such that the higher the speed of the vehicle, the more frequently integration is conducted and the smaller the adjustable gain, for controlling the amount of torque for friction compensation to apply to a steering motor.

6. The method of claim 5, further comprising generating a decouple compensation torque command by applying to the column torque an adjustable decouple gain that varies according to the column torque.

7. The method of claim 6, further comprising referring to a predetermined look up table for determining the adjustable decouple gain corresponding to the column torque.

8. The method of claim 6, further comprising synthesizing the friction compensation torque command and the decouple compensation torque command for generating an output signal of a friction compensation logic.

* * * * *